United States Patent Office 3,150,929
Patented Sept. 29, 1964

3,150,929
PROCESS FOR MAKING CUBIC CRYSTAL
BORON NITRIDE
Robert H. Wentorf, Jr., Schenectady, N.Y., assignor to General Electric Company, a corporation of New York
No Drawing. Filed Jan. 17, 1963, Ser. No. 252,067
5 Claims. (Cl. 23—191)

This invention is concerned with a process for making cubic crystal structure boron nitride. More particularly the invention relates to a process for making the aforesaid boron nitride by subjecting to elevated temperatures and pressures a mixture of (1) hexagonal boron nitride, or the combination of a source of boron selected from the class consisting of elemental boron and compounds of boron decomposable to elemental boron together with a source of nitrogen consisting of compounds of nitrogen such as nitrides or amines which will combine with boron under the conditions of the reaction, and (2) a metal selected from the class consisting of the actinide and lanthanide metals.

In U.S. Patent 2,947,617, issued August 2, 1960, and assigned to the same assignee as the present invention, there is disclosed and claimed a new physical form of boron nitride, particularly cubic crystal structure boron nitride. According to this patent, such materials are obtained by heating a source of boron and nitrogen of the above selected classes to elevated temperatures and pressures in the presence of at least one catalyst selected from the class consisting of alkali metals, alkaline earth metals, tin, lead, antimony, and nitrides of the foregoing metals. The cubic crystal structure boron nitride thus obtained unexpectedly has a hardness substantially equal to the hardness of diamonds, while at the same time exhibiting thermal stability superior to diamond material and other presently available abrasive materials because of its wholly inorganic structure. Because of its hardness, cubic crystal structure boron nitride is eminently useful in abrasive applications, as glass cutters, and as jewels in timepieces.

The cubic crystal structure boron nitride thus obtained has an atomic configuration corresponding to the atomic configuration of zincblende (ZnS). X-ray diffraction analysis of this material indicates a cubic structure analogous to zincblende with a unit cell edge length of about 3.615 Angstroms±0.001 Angstroms at 25° C. This material has a density of about 3.45 (when measured by the sink or float method in dense liquids) as compared with the expected density of 3.47 from the observed unit cell size.

Unexpectedly, I have discovered that another class of metals can act as an agent for conversion of the source of boron and nitrogen to cubic boron nitride and at the same time this class of metals yields a cubic boron nitride which is also radioactive. More particularly, I have found that one can employ the actinide and lanthanide metals as agents for converting the source of boron and nitrogen to the cubic boron nitride to give good yields of the cubic boron nitride. At the same time, the cubic boron nitride, because of the agents employed, exhibits radioactivity which exists unexpectedly throughout the matrix of the cubic boron nitride crystals.

The lanthanide metals which may be employed, are for instance, lanthanum, cerium, praseodymium, promethium, neodymium, samarium, europium, gadolinium, terbium, dysprosium, holmium, erbium, thulium, ytterbium, lutetium; and the actinides, specifically actinium, thorium, protactinium, uranium, neptunium, and plutonium.

Any source of boron and nitrogen which ultimately will form hexagonal boron nitride can be used in the preparation of the cubic boron nitride. Among such sources of boron may be mentioned, for instance, elemental boron, hexagonal boron nitride and compounds of boron decomposable to elemental boron at the above elevated temperatures and pressures required to make the cubic boron nitride.

If hexagonal boron nitride is not used initially with the lanthanide or actinide conversion agent, a source of nitrogen also must be present in the reaction zone. Among such sources of nitrogen may be mentioned hexagonal boron nitride itself, nitrides, amines, imines, azides, cyanides, cyanamides, and nitrogen-containing compounds of the lanthanides and the actinides which provide a source of nitrogen under the temperatures and pressures used for effecting formation of the cubic crystal structure boron nitride. Preferably, I prefer to start with hexagonal boron nitride which is a common type of boron nitride and which is a relatively soft, powdery material which is readily converted to the cubic crystal structure boron nitride.

The relative amounts of the ingredients used to make the cubic boron nitride can be varied widely. But when employing hexagonal nitride as the starting material, the lanthanide or actinide metal is preferably present in an amount equal to from about 0.1–100 percent, by weight, based on the weight of the hexagonal boron nitride. Where a source of boron and a source of nitrogen are employed, it is only required to use these latter two materials in the amounts necessary to give an optimum concentration of hexagonal boron nitride in the reaction zone. This would require taking into consideration, therefore, the atomic concentrations of the source of boron and the source of nitrogen before calculating the amount of actinide or lanthanide agent.

Instead of employing the actinide or lanthanide as the elemental metal, a compound of such metal may be employed which will decompose to the metal itself or to the metal nitride under the reaction conditions. Thus, one could employ lanthanum nitride or actinium nitride which, with boron, would give boron nitride. Alternatively, one could employ, for example, the lanthanum or actinium cyanamide with boron to produce under the requisite heating and pressure, cubic boron nitride. It is believed that the reaction involves a preliminary decomposition of the lanthanum or actinium cyanamide to produce actinium or lanthanum nitride and a boron nitride which together react to form the cubic boron nitride.

Thus, in one of the broader aspects of the present invention, it comprises a preparation of cubic boron nitride by subjecting a source of the conversion agent, namely, actinium or lanthanum, a source of nitrogen and a source of boron to suitable elevated temperatures and pressures, the conversion agent being selected from the class consisting of the actinide and lanthanide metals (which language is intended to include compounds decomposable to these metals under the conditions of the reaction), with the pressure and temperature being selected to be in the range in which the lanthanide or actinide is operative to catalyze the conversion of the hexagonal boron nitride to the cubic boron nitride. If desired, mixtures of one or more of the actinides and lanthanides can be employed. The use of alloys of these actinide and lanthanide metals is not precluded.

The reaction of the present invention is preferably carried out above certain minimums of pressures and temperatures. Thus, I prefer to carry out the reaction at a temperature in excess of 1000° C., for instance, above 1200° C. to as high as 3000° C. or higher. The pressure is advantageously maintained above a minimum of 40,000 atmospheres and preferably within the range of from about 50,000 to about 150,000 atmospheres. Good results are obtained when the temperature is within the range of from about 1300–2200° C. and the pressure is about 50,000 to 100,000 atmospheres.

The reaction of the present invention is carried out in the cubic boron nitride stable region under conditions of pressure and temperature close to the line WW, FIG. 1, found in my aforesaid Patent 2,947,617. My preference for operating near the equilibrium line WW is based on the fact that operation near this line tends to facilitate the growth of larger single crystals of cubic boron nitride than do conditions of pressure and temperature in the cubic boron nitride stable region more distant from the equilibrium line. It will, therefore, be apparent that a wide variety of pressures and temperatures may be employed in the method of the present invention. The only limitations on the pressure and temperature are that they be pressures and temperatures in the cubic boron nitride stable region and that they be in the range in which the particular conversion agent is effective to induce the desired result.

In carrying out the process of the present invention, the ratio of the conversion agent (or catalyst material) to hexagonal boron nitride may vary within extremely wide limits. However, in order to have the most efficient reaction, the amount of hexagonal boron nitride present in the reaction mixture should be sufficient to provide the nitrogen required for complete conversion of the actinide or lanthanide metal to the nitride thereof. It is believed that the actinide or lanthanide metal is first converted to its nitride and the remaining hexagonal boron nitride dissolves in or forms a complex with the actinide or lanthanide nitride and subsequently will be precipitated as cubic boron nitride. When using an actinide or lanthanide with a boron nitride, the boron nitride may be present in any amount providing it is sufficient to provide nitrogen for conversion of the lanthanide or actinide agent to the nitride thereof. When the catalyst nitrides are employed directly as catalysts, either reactant may be present in excess.

The time required for reaction of the present invention is usually quite short. Thus, satisfactory conversion of hexagonal boron nitride to cubic boron nitride can be accomplished in times as low as 30 seconds. Generally, it is preferred to maintain the reactants under reaction conditions for a time of about 3–8 minutes. No disadvantage will accrue by maintaining the reaction mixture in the cubic boron nitride stable region for extended periods of time. In some instances, the size of the cubic boron nitride crystals may increase with time.

The process of the present invention may be carried out in any type of high pressure, high temperature apparatus capable of maintaining necessary temperatures and pressures required for obtaining the cubic boron nitride. Such an apparatus is more particularly disclosed and claimed in Hall Patent 2,941,248, issued June 21, 1960, and assigned to the same assignee as the present invention. The disclosures of this patent are hereby incorporated by reference into the present application in order to avoid the necessity for describing the apparatus.

The following examples are illustrative of the practice of my invention and are not intended for the purposes of limitation. In all of the examples, the high pressure, high temperature apparatus of FIGS. 2 and 4 of the aforesaid Hall patent were employed with the exception that the inside diameter of the pyrophyllite reaction vessel was about 0.155–0.180 inch. Generally the process for carrying out the reaction involved packing a suitable tube positioned in a pyrophyllite reaction vessel with hexagonal boron nitride, the specific actinide or lanthanide metal, closing the press, increasing the pressure, and then heating the ingredients for about 3 minutes at the requisite pressure and temperature. After cooling the sample and reducing the pressure, the press was opened and the reaction mass removed, and the cubic boron nitride was isolated by dissolving the matrix in hydrochloric acid or aqua regia. This resulted in most cases in a mixture of some unreacted hexagonal boron nitride and the desired cubic crystal structure boron nitride. The cubic material was separated from the hexagonal material either by hand or by using a floatation technique in which the mixture was added to bromoform, in which the hexagonal boron nitride floats but in which the cubic boron nitride sinks. In all of the examples, resistance heating was employed for bringing the reactants to the desired temperature.

EXAMPLE 1

In this example, mixtures of hexagonal boron nitride with thorium metal were loaded into a carbon tube having an inside diameter of 0.08 inch, an outside diameter of 0.12 inch, and a length of 0.45 inch. Into this tube were placed 3 parts by volume of hexagonal boron nitride powder and 1 part by volume of small chips of thorium metal. This loaded carbon tube was placed in another hollow pyrophyllite cylinder having an inside diameter of 0.12 inch, an outside diameter of 0.350 inch and a length of 0.45 inch. The loaded holder was covered with titanium disks 0.01 inch thick and 0.350 inch in diameter, and placed in the above-described high pressure apparatus. After 3 minutes at the stipulated elevated temperatures and pressures, the cubic boron nitride was isolated from the mass as disclosed above. The identity of the cubic boron nitride was established by means of a scratch test in which the formed cubic boron nitride easily scratched boron carbide. Additional proof of the formation of the cubic crystal structure boron nitride was by means of X-ray diffraction patterns. The following Table I shows the pressures and temperatures employed.

Table I

| Charge to Reaction Vessel | Pressure, Atmospheres | Temperature, ° C. |
|---|---|---|
| Thorium + Hexagonal Boron Nitride | 65,000 | 2,000 |
| Do | 67,000 | 2,100 |
| Uranium + Hexagonal Boron Nitride | 67,000 | 2,000 |
| Lanthanum + Hexagonal Boron Nitride | 65,000 | 1,900 |

In each instance the crystals of cubic boron nitride were radioactive throughout their interior portions.

EXAMPLE 2

A mixture of 3 parts by volume of hexagonal boron nitride powder was mixed with 1 part by volume of lanthanum powder and was charged to the carbon tube and pyrophyllite reaction chamber described in Example 1. The assembly was sealed with tantalum end disks and subjected to a pressure of about 67,000 atmospheres and a temperature of 2000° C. for about 3–6 minutes. After cooling the capsule, it was removed from the press and treated with various acids described above to isolate the formed cubic boron nitride. Again the formation of cubic crystal structure boron nitride was established by means of the scratch test and by its X-ray diffraction pattern. The cubic boron nitride was also identified by means of its relatively high refractive index, which is about 2.22. Again, it was determined that the cubic boron nitride crystals showed a radioactivity readily measurable by a scintillation counter and gave an average count in excess of the background count.

EXAMPLE 3

A mixture of hexagonal boron nitride and uranium metal were heated and pressed in the same reaction vessel as described in Example 1, but using a temperature of 2100° C. for 1 minute and a pressure of about 56,000 atmospheres; thereafter the temperature was reduced to about 1500° C. during the course of 10 minutes, and finally to 30° C. while maintaining pressure. The capsule contents were isolated and treated as in the above examples to yield cubic boron nitride which again showed high radioactivity as was evidenced by the fact that when it was tested in a scintillation counter, which had a background count of 250 counts per minute, the cubic boron nitride showed a count of 263 counts per minute due to incorporation of uranium atoms in crystals of cubic boron nitride during the phase change from hexagonal to cubic crystal structure.

In addition to the hexagonal boron nitride employed in the foregoing examples, it will be apparent that one can employ a combination of a source of boron and a source of nitrogen with actinide and lanthanide metals. In addition, the conditions and the particular conversion agent (or catalyst) used may be varied, and may include any of the actinide and lanthanide metals heretofore recited.

What I claim as new and desire to secure by Letters Patent of the United States is:

1. The process for making cubic crystal structure boron nitride which comprises subjecting at elevated temperatures and pressures, a mixture of ingredients comprising (1) at least one metal selected from the class consisting of the actinide and the lanthanide metals and (2) a source of boron and a source of nitrogen selected from the class consisting of elemental boron, hexagonal boron nitride, compounds of boron decomposable to elemental boron at the above elevated temperatures and pressures, nitrogen-containing compounds of the actinide metals and nitrogen-containing compounds of the lanthanide metals, and thereafter recovering cubic crystal structure boron nitride.

2. The method of making cubic crystal structure boron nitride which comprises subjecting hexagonal boron nitride to a pressure in excess of 40,000 atmospheres and a temperature in excess of 1000° C. in the presence of a metal selected from a class consisting of the actinide and lanthanide metals, said pressure and temperature being selected to be in the range in which the metal is operative to effect conversion of the hexagonal boron nitride to the cubic boron nitride, and thereafter recovering boron nitride having a cubic crystal structure.

3. The process for making cubic crystal structure boron nitride which comprises subjecting to a temperature in excess of 1000° C. and a pressure in excess of 40,000 atmospheres a mixture of ingredients comprising hexagonal boron nitride and uranium, and thereafter recovering radioactive cubic crystal structure boron nitride.

4. The process for making cubic crystal structure boron nitride which comprises subjecting to a temperature in excess of 1000° C. and a pressure in excess of 40,000 atmospheres a mixture of ingredients comprising hexagonal boron nitride and thorium, and thereafter recovering radioactive cubic crystal structure boron nitride.

5. The process for making cubic crystal structure boron nitride which comprises subjecting to a temperature in excess of 1000° C. and a pressure in excess of 40,000 atmospheres a mixture of ingredients comprising hexagonal boron nitride and lanthanum, and thereafter recovering cubic crystal structure boron nitride.

No references cited.